United States Patent
Lai et al.

(10) Patent No.: US 12,123,767 B2
(45) Date of Patent: Oct. 22, 2024

(54) LIGHT SENSOR

(71) Applicant: Qisda Corporation, Taoyuan (TW)

(72) Inventors: Che-Yi Lai, Taoyuan (TW);
Chun-Ming Shen, Taoyuan (TW);
Chin-Kuei Lee, Taoyuan (TW);
Chih-Chia Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 233 days.

(21) Appl. No.: 17/832,774

(22) Filed: Jun. 6, 2022

(65) Prior Publication Data

US 2023/0341257 A1  Oct. 26, 2023

(30) Foreign Application Priority Data

Apr. 21, 2022 (CN) .......................... 202210424314.9

(51) Int. Cl.
*G01J 1/04* (2006.01)
*G01J 1/42* (2006.01)
*G02B 6/42* (2006.01)

(52) U.S. Cl.
CPC ............ *G01J 1/0422* (2013.01); *G01J 1/4204* (2013.01); *G02B 6/4203* (2013.01)

(58) Field of Classification Search
None
See application file for complete search history.

(56) References Cited

U.S. PATENT DOCUMENTS

| | | | | |
|---|---|---|---|---|
| 5,278,929 A * | 1/1994 | Tanisawa | ............. | G02B 6/4246 385/93 |
| 5,495,545 A * | 2/1996 | Cina | .................... | G02B 6/4206 385/92 |
| 5,953,145 A * | 9/1999 | Koyama | ........... | H01L 31/02325 257/E31.127 |
| 6,243,508 B1 * | 6/2001 | Jewell | .................... | G02B 6/423 385/88 |
| 7,625,136 B2 * | 12/2009 | Miyamae | ............. | G02B 6/4204 385/94 |
| 7,654,750 B2 * | 2/2010 | Brenner | ............... | G02B 6/4246 385/89 |
| 8,809,125 B2 * | 8/2014 | Aizpuru | ................ | H01S 5/0232 257/E33.059 |
| 10,147,853 B2 * | 12/2018 | Keller | ..................... | H01L 33/56 |
| 2002/0071459 A1 * | 6/2002 | Malone | ................ | G02B 6/4212 372/29.02 |
| 2003/0136650 A1 * | 7/2003 | Lai | ....................... | H01H 13/807 200/1 B |
| 2004/0109629 A1 * | 6/2004 | Kondo | ............... | G02B 6/12004 385/14 |

(Continued)

FOREIGN PATENT DOCUMENTS

| | | |
|---|---|---|
| CN | 1284011 C | 11/2006 |
| CN | 20896954 U | 6/2019 |
| CN | 106662686 B | 6/2020 |

*Primary Examiner* — Jerry Rahll

(57) ABSTRACT

A light sensor includes an optoelectronic device and a light guide element. The light guide element has a first light incident surface and a light exit surface, so as to allow an incident light to enter the light guide element from the first light incident surface and then exit to the optoelectronic device from the light exit surface; wherein at least one of the light incident surface and the light exit surface has a single curved surface.

13 Claims, 6 Drawing Sheets

(56) References Cited

U.S. PATENT DOCUMENTS

| | | | |
|---|---|---|---|
| 2005/0124224 A1* | 6/2005 | Schunk | G02B 6/4261 |
| | | | 439/638 |
| 2005/0168987 A1* | 8/2005 | Tamaoki | G02B 6/4298 |
| | | | 257/E33.071 |
| 2006/0060882 A1* | 3/2006 | Ohe | H01L 31/0203 |
| | | | 257/E33.059 |
| 2010/0239212 A1* | 9/2010 | Mitamura | G02B 6/4207 |
| | | | 385/93 |
| 2013/0168537 A1* | 7/2013 | Shin | G02B 6/4267 |
| | | | 385/79 |
| 2014/0346333 A1* | 11/2014 | Higashikata | G01J 1/0266 |
| | | | 250/227.29 |
| 2015/0244465 A1* | 8/2015 | Chou | H05K 3/301 |
| | | | 398/201 |
| 2015/0268425 A1* | 9/2015 | de Jong | G02B 6/4214 |
| | | | 385/33 |
| 2018/0014092 A1* | 1/2018 | Martin | G01J 1/0271 |
| 2018/0330140 A1* | 11/2018 | Lin | G06V 40/1318 |
| 2019/0086619 A1* | 3/2019 | Chen | G02B 19/0028 |
| 2019/0162389 A1* | 5/2019 | Shah | G02B 19/0028 |
| 2022/0163833 A1* | 5/2022 | He | G02F 1/133615 |

* cited by examiner

LIGHT SENSOR

This application claims the benefit of People's Republic of China application Serial No. 202210424314.9, filed Apr. 21, 2022, the subject matter of which is incorporated herein by reference.

BACKGROUND OF THE INVENTION

Field of the Invention

The invention relates in general to an optoelectronic semiconductor element.

Description of the Related Art

An ambient light sensor (ALS) is an optoelectronic semiconductor element used as an element for converting optical/electric signals through the interaction between photons and electrons, such as radiation excitation and absorption, and has been widely used in electronic mobile devices, such as mobile phones, tablets and notebooks or even in vehicles and liquid crystal TVs. The ambient light sensor can identify the ambient luminance and then control the light source of the display of the electronic mobile device to adjust the screen brightness, so that the screen is clearer and brighter to the viewer, and better display quality can be achieved.

Moreover, when the electronic mobile device is placed in an environment with a large amount of light, the ambient light sensor can turn off the backlight of the display in response to the ambient luminance. Conversely, at the nighttime when the amount of light is small, the ambient light sensor can turn on the backlight of the display. Through flexible adjustment, power consumption of the backlight can be reduced, and duration of the electronic mobile device can be increased. However, since the ambient light is non-directional and non-uniform, the ambient light sensor may easily misjudge the intensity of the ambient light source. Under such circumstance, the display may perform unexpected actions, and the user's operation will be affected.

Therefore, it has become a prominent task for the industries to provide an advanced light sensor to resolve the problems encountered in the prior art.

SUMMARY OF THE INVENTION

The invention is directed to a light sensor, which includes an optoelectronic device and a light guide element. The light guide element has a first light incident surface and a light exit surface, so as to allow an incident light to enter the light guide element from the first light incident surface and then exit to the optoelectronic device from the light exit surface; wherein at least one of the light incident surface and the light exit surface has a single curved surface.

According to one embodiment of the present invention, a light sensor is provided. The light sensor includes an optoelectronic device and a light guide element. The light guide element has a first light incident surface and a light exit surface, so as to allow an incident light to enter the light guide element from the first light incident surface and then exit to the optoelectronic device from the light exit surface; wherein the light guide element further includes a second light incident surface separated from the first light incident surface; the first light incident surface and the second light incident surface both face a first direction.

According to another embodiment of the present invention, an electronic device with a light sensor is provided. The light sensor includes a light guide element and the optoelectronic device. The ambient light enters the light guide element from at least one light incident surface and then exits to the optoelectronic device of the light sensor from the single light surface. By controlling the surface radian and/or micro-structure of at least one of the light incident surface and the light exit surface of the light guide element and optionally adding a plurality of scattering particles to the light guide element, the electronic device can enhance the light uniformity of the ambient light collected and avoid the light sensor misjudging the ambient light and generating unexpected actions.

The above and other aspects of the invention will become better understood with regard to the following detailed description of the preferred but non-limiting embodiment (s). The following description is made with reference to the accompanying drawings.

DETAILED DESCRIPTION OF THE INVENTION

The present invention provides a light sensor capable of enhancing the light reception and light uniformity of the ambient light collected and avoiding the light sensor misjudging the ambient light and generating unexpected actions. For the object, technical features and advantages of the present invention to be more easily understood by anyone ordinary skilled in the technology field, a number of exemplary embodiments are disclosed below with detailed descriptions and accompanying drawings.

It should be noted that these embodiments are for exemplary and explanatory purposes only, not for limiting the scope of protection of the invention. The invention can be implemented by using other features, elements, methods and parameters. The preferred embodiments are merely for illustrating the technical features of the invention, not for limiting the scope of protection. Anyone skilled in the technology field of the invention will be able to make suitable modifications or changes based on the specification disclosed below without breaching the spirit of the invention.

Designations common to the accompanying drawings are used to indicate identical or similar elements.

Figure 1:
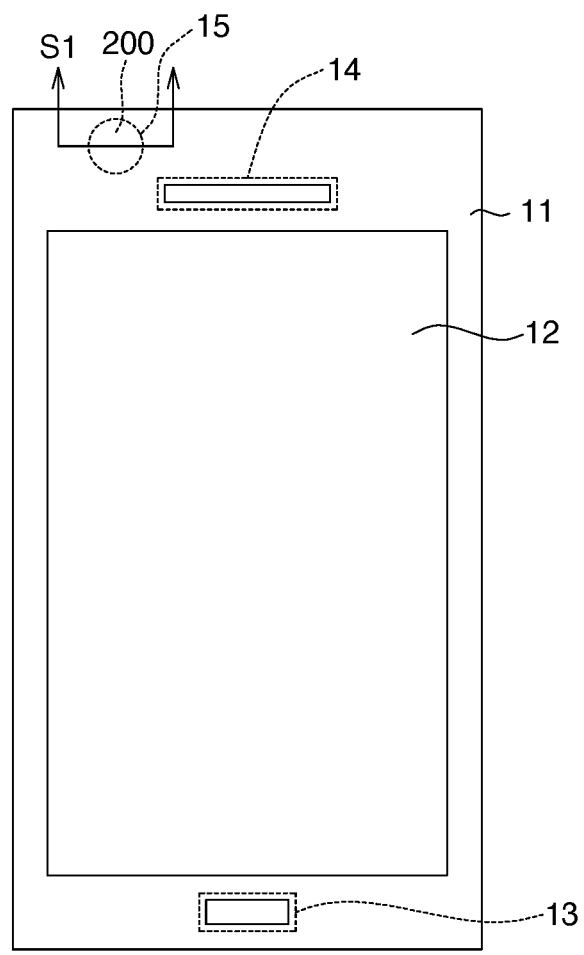
FIG. 1 is a front view of the structure of a smart phone with a light sensor according to an embodiment of the present invention.

The light sensor 200 of the present invention can be built in (but is not limited to) an electronic device (such as mobile phone, tablet or notebook). For example, in some embodiments of the present invention, the light sensor 200 can be built in a smart phone 10. Referring to FIG. 1, FIG. 1 is a front view of the structure of a smart phone 10 with a light sensor 200 according to an embodiment of the present invention. The smart phone 10 includes a housing 11, a display panel 12, a microphone 13, a speaker 14, and a light sensor 200. The display panel 12 adopts a touch screen, which provides with both display function and input function. The light sensor 200 is disposed in the housing 11 to sense an ambient light entering the electronic device from outside. In the present embodiment, the light sensor 200 is not exposed outside the housing 11 of the smart phone 10; the light sensor 200 is separated from the outside by a transparent top panel 15. The external ambient light L can penetrate the top panel 15 to enter the light sensor 200.

Figure 2:
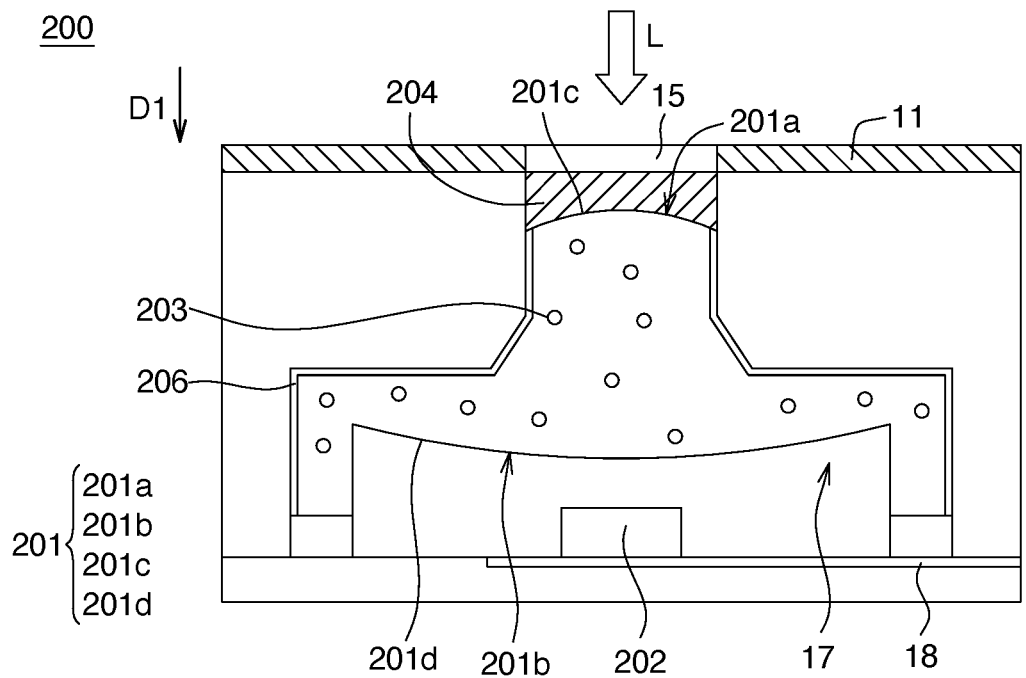
FIG. 2 is a cross-sectional view of a partial enlargement of the structure of a light sensor along cross-sectional line S1 of FIG. 1.

Referring to FIG. 2, FIG. 2 is a cross-sectional view of a partial enlargement of the structure of a light sensor 200 along cross-sectional line S1 of FIG. 1. The light sensor 200 includes an optoelectronic device 201 and a light guide element 202. The light guide element 201 has a light incident surface 201a and a light exit surface 201b. The light incident surface 201a faces the top panel 15 of the housing 11 and the light exit surface 201b faces the optoelectronic device 202, so as to allow the external ambient light L, after penetrating the top panel 15, to enter the light guide element 201 from the light incident surface 201a and then exit to the optoelectronic device 202 from the light exit surface 201b.

In some embodiments of the present invention, the light exit surface 201b can directly contact the optoelectronic device 202, and the external ambient light L, after entering the light guide element 201, can directly enter the optoelectronic device 202 through a contact interface (not illustrated) between the light exit surface 201b and the optoelectronic device 20. In the present embodiment, an air medium 17 can be disposed between the light exit surface 201b and the optoelectronic device 202. The external ambient light L, after entering the light guide element 201, must exit from the light exit surface 201b and pass through the air medium 17 so to enter the optoelectronic device 202.

The optoelectronic device 202, which can be realized by (but is not limited to) a photodiode element, a charge-coupled device (CCD) or an intensified charge-coupled device (ICCD), is electrically connected to the circuit board 18 of the smart phone 10 to sense an incident light by means of photovoltaic effect and further transmit the generated current signal or voltage signal to the central processing unit (CPU; not illustrated) of the smart phone 10 through the conducting wire of the circuit board 18.

In some embodiments of the present invention, the light guide element 201 can be a light guide structure formed of a translucent material (such as polycarbonate (PC), glass or other translucent material); and at least one of the light incident surface 201a and the light exit surface 201b of the light guide element 201 has a single curved surface for collecting the ambient light L, which penetrates the top panel 15 and enters the light sensor 200. In some embodiments of the present invention, the light guide element 201 may further include an opaque reflective layer 206 covering the surface of the light guide element 201 to limit the incident light (such as the external ambient light L) of the light guide element 201 to be propagated between the light incident surface 201a and the light exit surface 201b. The opaque reflective layer 206 is formed on a surface other than the light incident surface 201a and the light exit surface 201b of the light guide element 201. The light is reflected from the wall of the light guide element 201 and lastly exits from the light exit surface 201b, so that brightness decay caused by light leakage can be avoided. The opaque reflective layer 206, formed of a material with high reflectivity, covers the light guide element 201 by way of such as PVD, electroplating, or spraying.

In the present disclosure, "single curved surface" refers to the curved surface formed by single arced segments at the two ends of the cross-sectional contour of the light guide element 201 parallel to the incident direction D1 of the ambient light L. In the present embodiment (referring to FIG. 2), both the light incident surface 201a and the light exit surface 201b of the light guide element 201 have a single curved surface. The light incident surface 201a has a first curved surface 201c (see the arced profile); the light exit surface 201b has a second curved surface 201d (see the arced profile); and the first curved surface 201c and the second curved surface 201d can have identical radians. In another embodiment, the first curved surface 201c and the second curved surface 201d can have different radians.

In an embodiment, the projection area of the light exit surface 201b on the optoelectronic device 202 is greater than the projection area of the light incident surface 201a on the optoelectronic device 202, such that more lights propagated within the light guide element 201 can be captured, collected and then projected to the optoelectronic device 202. In another embodiment, the edge of the light guide element 201 is further extended towards the direction D1, so that the light guide element 201 can be directly covered on the peripheral sides of the optoelectronic device 202. In some embodiments, the edge of the light guide element 201 can be further extended outwards in a direction perpendicular to the direction D1 to be combined with the housing, then the light guide element 201 in combination with the housing can cover on the peripheral outsides of the optoelectronic device 202. However, the present invention is not limited to the above exemplifications.

In some embodiments of the present invention, the light guide element 201 can optionally include a plurality of scattering particles 203 scattered in a translucent material (medium). The scattering particles 203 have an average particle size less than a wavelength of the ambient light L, which enters the light sensor 200. In the present embodiment, the ambient light L, which enters the light sensor 200, can be limited to a visible light with a wavelength of 360 to 830 nanometers (nm). The average particle size of the scattering particles 203 can be between 50 nm and 300 nm and preferably is between 100 nm and 250 nm. When the light is propagated in the medium of the light guide element 201, the light will be reflected or scattered by the scattering particles 203, and the scattering particles 203 with a suitable density and a suitable particle size can enable the light propagated in the medium of the light guide element 201 to be fully mixed, so as to make the intensity of the light exiting from the light exit surface 201b and entering the optoelectronic device 202 more uniformed. Thus, the brightness of the captured ambient light L can be uniformed, and the optoelectronic device 202 can be effectively prevented from misjudging the ambient light L. In an exemplary embodiment, the projection area of the light exit surface 201b on the optoelectronic device 202 is greater than the projection area of the light incident surface 201a on the optoelectronic device 202, such that more lights propagated within the light guide element 201 can be captured, collected and projected to the optoelectronic device 202.

To control the wavelength of the ambient light L, which enters the light sensor 200, in some embodiments of the present invention, the light sensor 200 may further include an optical filter 204 optionally disposed outside the light incident surface 201a of the light guide element 201 of the optoelectronic device 200 and between the light incident surface 201a and the top panel 15 of the housing 11. In the present embodiment, the optical filter 204 can be a filter layer. The optical filter 204 can block the light other than the visible light, such as near infrared light with a wavelength of 830 nm to 2500 nm and/or UV light with a wavelength of 100 nm to 360 nm, from entering the light guide element 201. The light received by the optoelectronic device 202 can be limited to a narrower range, hence preventing the light with other wavelengths from interfering with the conversion of the current signal or voltage signal and avoiding the light sensor 200 misjudging the ambient light L. The optical filter 204 can be disposed outside the light incident surface 201a of the light guide element 201 by means of electroplating and adhesion.

Figure 3:
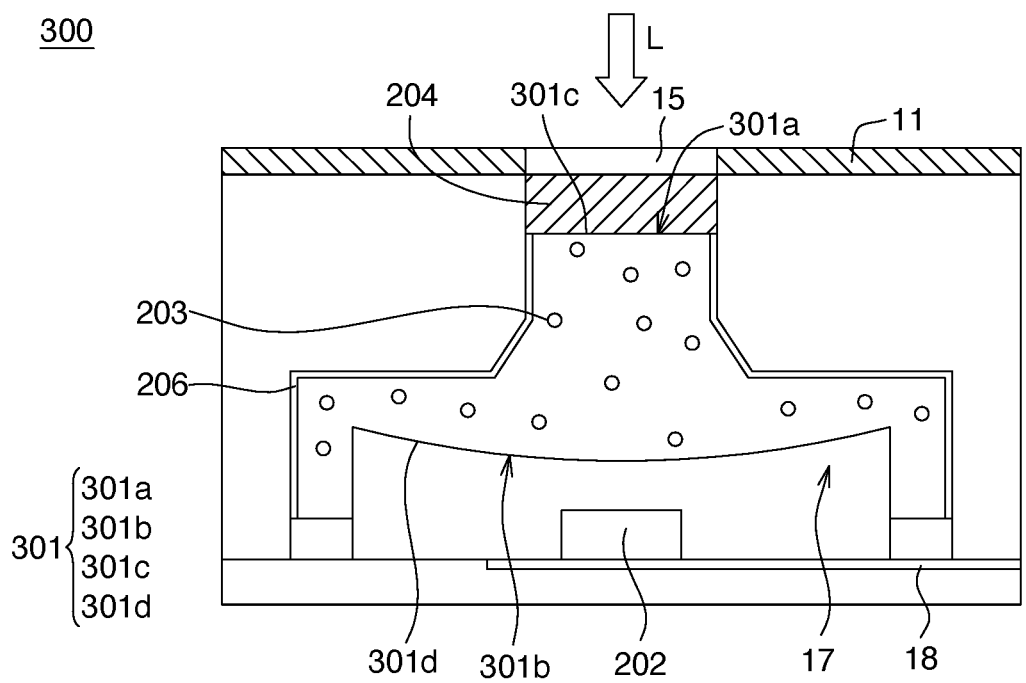
FIG. 3 is a cross-sectional view of a partial enlargement of the structure of a light sensor according to another embodiment of the present invention.

Referring to FIG. 3, FIG. 3 is a cross-sectional view of a partial enlargement of the structure of a light sensor 300 according to another embodiment of the present invention. The light sensor 300 is similar to the light sensor 200 of FIG. 2, except that in the light sensor 300, the light incident surface 301a of the light guide element 301 substantially is a plane 301c, and the light exit surface 301b of the light guide element 301 is a single curved surface 301d (convex surface). Since the structure of the light sensor 300 identical to that of the light sensor 200 are already disclosed above, thus will not be redundantly described here.

Figure 4:
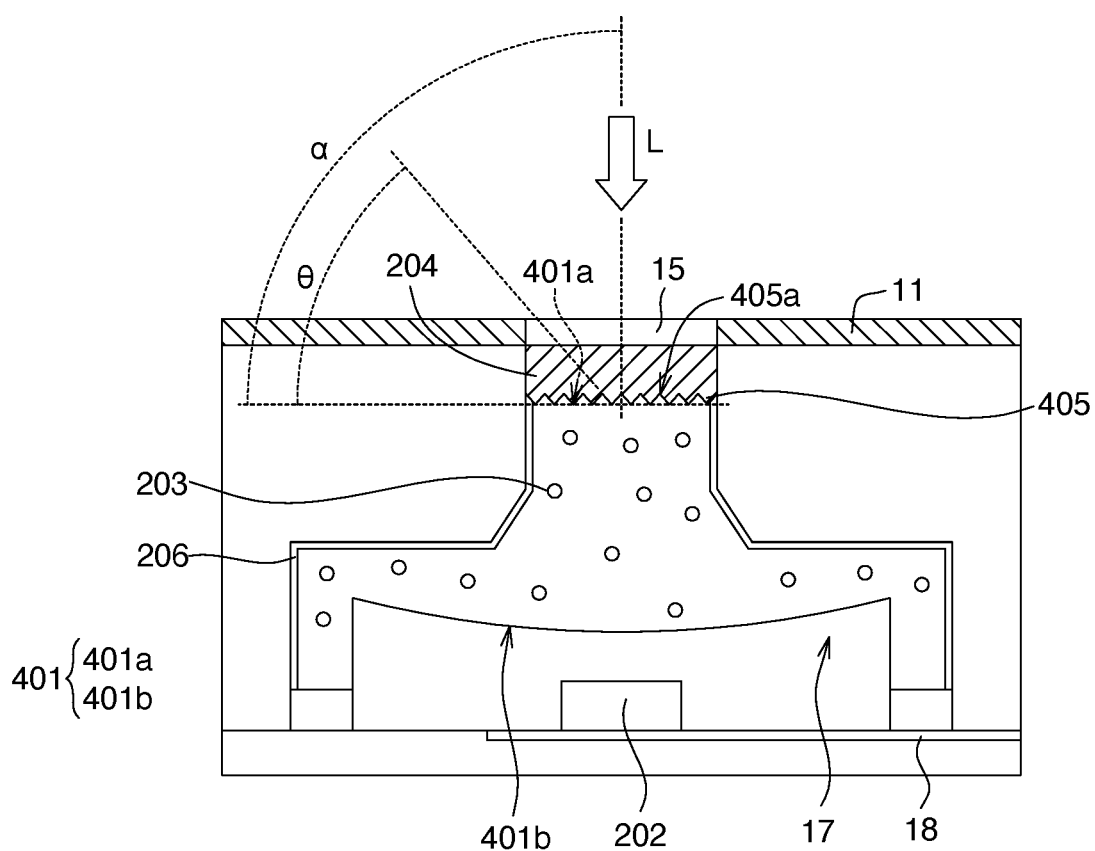
FIG. 4 is a cross-sectional view of a partial enlargement of the structure of a light sensor according to another embodiment of the present invention.

Referring to FIG. 4, FIG. 4 is a cross-sectional view of a partial enlargement of the structure of a light sensor 400 according to another embodiment of the present invention. The light sensor 400 is similar to the light sensor 300 of FIG. 3, except that in the light sensor 400, the light incident surface 401a of the light guide element 401 further has a micro-structure 405. In some embodiments of the present invention, the micro-structure 405 can be formed of a plurality of protrusions protruded from the light incident surface 401a. In some other embodiments of the present invention, the micro-structure 405 can be formed of a plurality of depressions depressed into the light incident surface 401a. In the present embodiment, the micro-structure 405 is formed of a plurality of prisms protruded from the light incident surface 401a. Each prism includes an inclined plane 405a, which forms an angle θ with the light incident surface 401a (plane), wherein the angle θ is substantially less than the incident angle α of the ambient light L perpendicular to the light incident surface 401a.

In the present embodiment, although the micro-structure 405 is disposed on the light incident surface 401a, which is substantially a plane, and can be neatly arranged as a convex matrix, the position, shape and arrangement of the micro-structure 405 are not limited to above exemplifications. In some embodiments of the present invention, the micro-structure 405 can be realized by any protrusions, depressions or a combination thereof arranged on the light incident surface 401a and/or the light exit surface 401b of the light guide element 401 (substantially a plane or a curved surface) in any manner.

Figure 5:
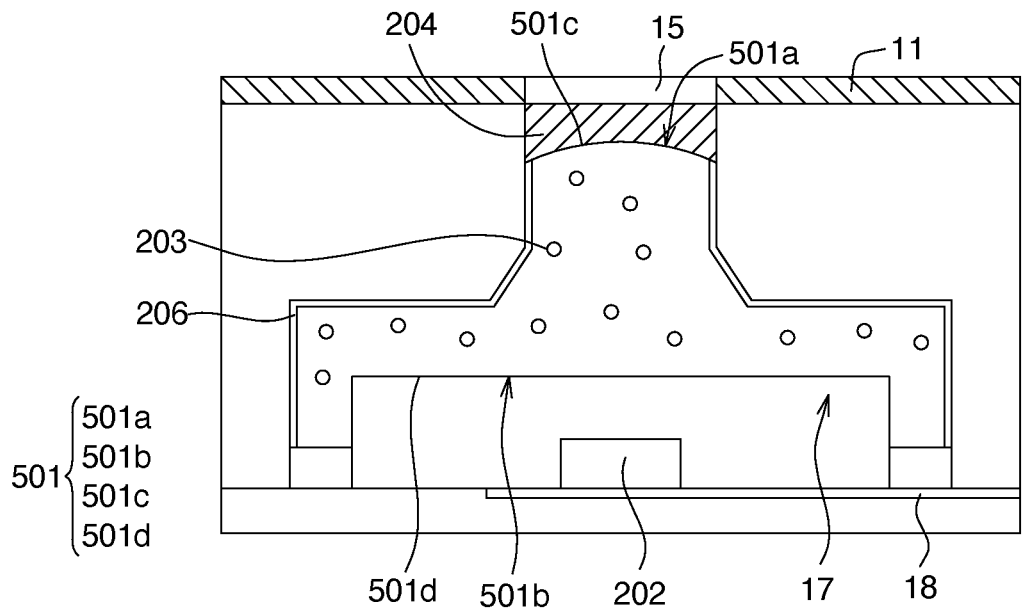
FIG. 5 is a cross-sectional view of a partial enlargement of the structure of a light sensor according to another embodiment of the present invention.

Referring to FIG. 5, FIG. 5 is a cross-sectional view of a partial enlargement of the structure of a light sensor 500 according to another embodiment of the present invention. The light sensor 500 is similar to the light sensor 200 of FIG. 2, except that in the light sensor 500, the light exit surface 501a of the light guide element 501 substantially is a single curved surface (convex surface) 501c, and the light exit surface 501b of the light guide element 501 is a plane 501d. Since the structure of the light sensor 500 identical to that of the light sensor 200 are already disclosed above, thus will not be redundantly described here.

Figure 6:
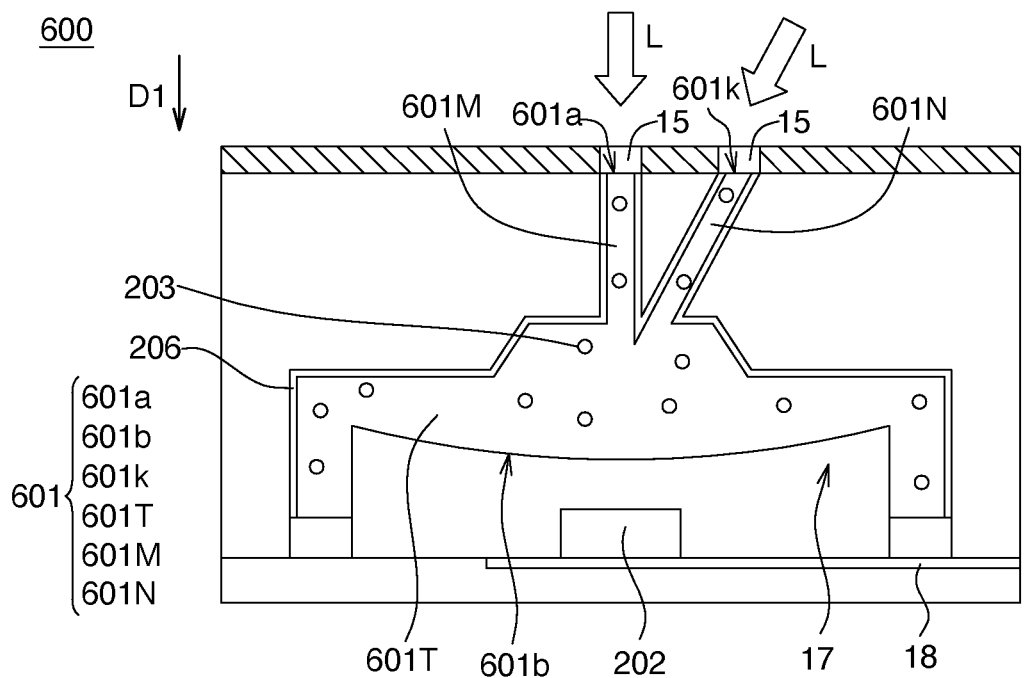
FIG. 6 is a cross-sectional view of a partial enlargement of the structure of a light sensor according to another embodiment of the present invention.

Referring to FIG. 6, FIG. 6 is a cross-sectional view of a partial enlargement of the structure of a light sensor 600 according to another embodiment of the present invention. The light sensor 600 is similar to the light sensor 200 of FIG. 2, except that the light guide element 601 of the light sensor 600 includes a first light incident surface 601a and a second light incident surface 601k, wherein the first light incident surface 601a and the second light incident surface 601k are separated from each other and are located on the same side of the light sensor 600 or face to the same direction D1.

Specifically, the light guide element 601 includes a body 601T, a first connection portion 601M and a second connection portion 601N. The light exit surface 601b of the light guide element 601 is located at an edge under the body 601T and faces to the optoelectronic device 202. The first connection portion 601M and the second connection portion 601N are separated from each other and respectively are extended towards the top panel 15 of the housing 11 from the body 601T to define a first light incident surface 601a and a second light incident surface 601k at the end of extension, wherein the first light incident surface 601a and the second light incident surface 601k are parallel to each other, face to a direction (such as direction D1) perpendicular to the top panel 15 and face to the top panel 15. Thus, the external ambient light L, after penetrating the top panel 15, enters the first connection portion 601M and the second connection portion 601N from the first light incident surface 601a and the second light incident surface 601k respectively, propagates to the body 601T and then exits to the optoelectronic device 202 from the light exit surface 601b. Through the above separated arrangement of the first light incident surface 601a and the second light incident surface 601k, a small increase in the light collection area can get an obvious expansion in the scope of light collection, so that actual state of the external ambient light L can be more accurately determined.

Figure 7:
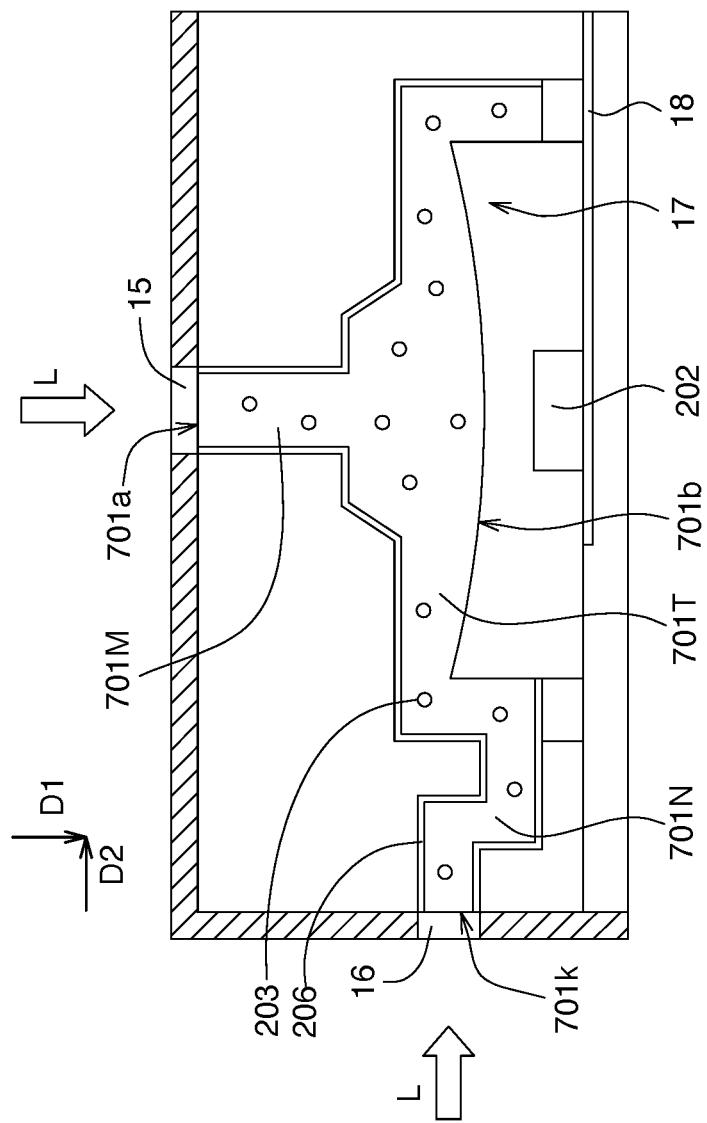
FIG. 7 is a cross-sectional view of a partial enlargement of the structure of a light sensor according to another embodiment of the present invention.

Referring to FIG. 7, FIG. 7 is a cross-sectional view of a partial enlargement of the structure of a light sensor 700 according to another embodiment of the present invention. The light sensor 700 is similar to the light sensor 600 of FIG. 6 with a similar structure: they both include a first light incident surface and a second light incident surface that are separated from each other. The light sensor 700 is different from the light sensor 600 in that the first light incident surface 701a and the second light incident surface 701k of the light sensor 700 are separated from each other and face towards two different directions D1 and D2, wherein the directions D1 and D2 form an angle not equivalent to 180° (such as an angle of 90°).

Specifically, the light guide element 701 includes a body 701T, a connection portion 701M and a second connection portion 701N. The light exit surface 701b of the light guide element 701 is located at an edge under the body 701T and faces to the optoelectronic device 202. The first connection portion 701M and the second connection portion 701N are separated from each other. The first connection portion 701M is extended towards the top panel 15 of the housing 11 from the body 701T and defines a first light incident surface 701a at the end of extension, wherein the first light incident surface 701a faces to the direction D1 perpendicular to the top panel 15 and faces to the top panel 15. Thus, the external unidirectional ambient light L, after penetrating the top panel 15, enters the first connection portion 701M from the first light incident surface 701a, propagates to the body 701T and then exits to the optoelectronic device 202 from the light exit surface 701b.

The second connection portion 701N is extended towards the side panel 16 of the housing 11 from another end of the body 701T and defines a second light incident surface 701k at the end of extension, wherein the second light incident surface 701k faces to the direction D2 perpendicular to side panel 16 and faces to a side panel 16. Thus, the external ambient light L, after penetrating side panel 16, enters the second connection portion 701N from the second light incident surface 701k, propagates to the body 701T and then exits to the optoelectronic device 202 from the light exit surface 701b. Through the above separated arrangement of the first light incident surface 701a and the second light incident surface 701k, a small increase in the light collection area can get an obvious expansion in the scope of light collection, so that the scope of light collection is not limited to the same side and actual state of the external ambient light L can be more accurately determined.

Figure 8:
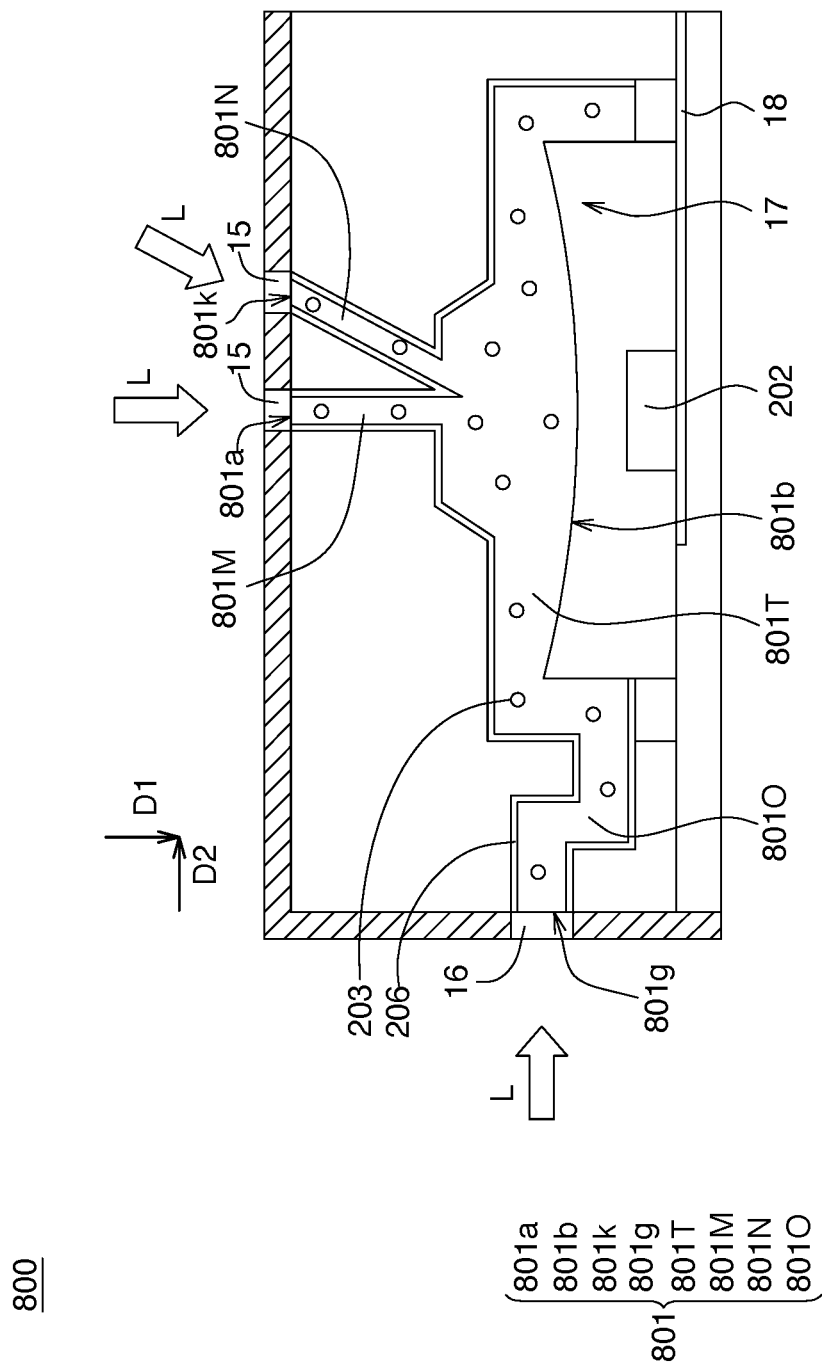
FIG. 8 is a cross-sectional view of a partial enlargement of the structure of a light sensor according to another embodiment of the present invention.

Referring to FIG. 8, FIG. 8 is a cross-sectional view of a partial enlargement of the structure of a light sensor 800 according to another embodiment of the present invention. The light sensor 800 is similar to the light sensor 700 of FIG. 7, except that the light guide element 801 of the light sensor 800 includes a first light incident surface 801a, a second light incident surface 801k and a third light incident surface 801g, that are separated from each other. The first light incident surface 801a and the second light incident surface 801k are parallel with each other and face to the same direction (such as direction D1); the third light incident surface 801g is perpendicular to the first light incident surface 801a and the second light incident surface 801k and faces another direction (such as direction D2).

Specifically, the light guide element 801 includes a body 801T, a first connection portion 801M, a second connection portion 801N and a third connection portion 801O. The light exit surface 801b of the light guide element 801 is located at an edge under the body 801T and faces to the optoelectronic device 202. The first connection portion 801M and the second connection portion 801N are separated from each other and are respectively extended to the top panel 15 of the housing 11 from the body 801T and respectively define a first light incident surface 801a and a second light incident surface 801k at the end of extension, wherein the first light incident surface 801a and the second light incident surface 801k are parallel to each other, face a direction D1 perpendicular to the top panel 15 and face to the top panel 15 of the housing 11. Thus, the external ambient light L, after penetrating the top panel 15, enters the first connection portion 801M and the second connection portion 801N from the first light incident surface 801a and the second light incident surface 801k respectively, propagates to the body 801T and then exits to the optoelectronic device 202 from the light exit surface 801b.

The third connection portion 801O is extended to the side panel 16 (translucent panel) of the housing 11 from the other end of the body 801T and defines a third light incident surface 801g at the end of extension, wherein the third light incident surface 801g faces to the direction D2 perpendicular to side panel 16 and is aligned with the side panel 16. Thus, the external ambient light L, after penetrating side panel 16, enters the third connection portion 801O from the third light incident surface 801g, propagates to the body 801T and then exits to the optoelectronic device 202 from the light exit surface 801b. Through the above separated arrangement of the first light incident surface 801a and the second light incident surface 801k, a small increase in the light collection area can get an obvious expansion in the scope of light collection, so that the scope of light collection is not limited to the same side and actual state of the external ambient light L can be more accurately determined. Furthermore, several light incident surfaces can be disposed on different edges of the body 801T at different angles to increase the angles and the scope of light collection.

According to the above embodiments, a light sensor of an electronic device is provided. The light sensor includes a light guide element and an optoelectronic device. The ambient light enters the light guide element from at least one light incident surface and then enters the optoelectronic device of the light sensor from single light exit surface. By controlling the surface radian and/or micro-structure of at least one of the light incident surface and the light exit surface of the light guide element and optionally adding a plurality of scattering particles to the light guide element, the light collection and light uniformity of the ambient light collected can be enhanced, hence avoiding the light sensor misjudging the ambient light and generating unexpected actions.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light sensor, comprising:
   an optoelectronic device; and
   a light guide element having a first light incident surface, a second light incident surface separated from the first light incident surface and a light exit surface, so as to allow an incident light to enter the light guide element from the first light incident surface and the second light incident surface, and then exit to the optoelectronic device from the light exit surface; wherein at least one of the light incident surface and the light exit surface has a single curved surface;
   wherein the light guide element comprises a body, a first connection portion and a second connection portion separated from each other and respectively extending form the body to define the first light incident surface and the second light incident surface.

2. The light sensor according to claim 1, wherein the first light incident surface has a first curved surface; the light exit surface has a second curved surface.

3. The light sensor according to claim 2, wherein the first curved surface and the second curved surface have an identical radian.

4. The light sensor according to claim 1, wherein the light guide element comprises a translucent material and a plurality of particles scattered in the translucent material; the scattering particles have an average particle size less than a wavelength of the incident light.

5. The light sensor according to claim 4, wherein the incident light is a natural light.

6. The light sensor according to claim 1, further comprising an opaque reflective layer covering a surface of the light guide element for limiting the incident light, which enters the light guide element, to be propagated between the first light incident surface and the light exit surface.

7. The light sensor according to claim 1, further comprising a filter layer located outside the first light incident surface for filtering the incident light.

8. The light sensor according to claim 1, wherein the first light incident surface substantially is a plane; the light exit surface has a curved surface; the first light incident surface has a micro-structure.

9. The light sensor according to claim 8, wherein the micro-structure comprises an inclined plane which forms an angle with the plane; the angle is substantially less than an incident angle of the incident light.

10. The light sensor according to claim 1, wherein the first light incident surface and the second light incident surface both face a first direction.

11. The light sensor according to claim 1, wherein the light guide element further comprises a third light incident surface; the first light incident surface faces a first direction; the third light incident surface faces a second direction; the second direction and the first direction form an angle not equivalent to 180°.

12. A light sensor, comprising:
an optoelectronic device; and
a light guide element having a first light incident surface and a light exit surface, so as to allow an incident light to enter the light guide element from the first light incident surface and then exit to the optoelectronic device from the light exit surface; wherein the light guide element further comprises a second light incident surface separated from the first light incident surface; the first light incident surface and the second light incident surface both face a first direction,
wherein the light guide element comprises a body, a first connection portion and a second connection portion separated from each other and respectively extending from the body to define the first light incident surface and the second light incident surface.

13. The light sensor according to claim 12, wherein the light guide element further comprises a third light incident surface; the first light incident surface faces a first direction; the third light incident surface faces a second direction; the second direction and the first direction form an angle not equivalent to 180°.

* * * * *